(12) United States Patent
Hughes et al.

(10) Patent No.: US 11,737,438 B2
(45) Date of Patent: Aug. 29, 2023

(54) MODULAR FISHING ROD SYSTEM

(71) Applicant: BATES FISHING, INC., Celina, TX (US)

(72) Inventors: Buddy Hughes, Celina, TX (US); Karl H. Beitzel, Canton, OH (US)

(73) Assignee: BATES FISHING, INC., Celina, TX (US)

( * ) Notice: Subject to any disclaimer, the term of this patent is extended or adjusted under 35 U.S.C. 154(b) by 403 days.

(21) Appl. No.: 16/880,429

(22) Filed: May 21, 2020

(65) Prior Publication Data
US 2021/0360909 A1  Nov. 25, 2021

(51) Int. Cl.
*A01K 87/02* (2006.01)
*A01K 87/00* (2006.01)
*F16B 7/04* (2006.01)

(52) U.S. Cl.
CPC ............. *A01K 87/02* (2013.01); *A01K 87/00* (2013.01); *A01K 87/025* (2013.01); *F16B 7/0413* (2013.01)

(58) Field of Classification Search
CPC ........ A01K 87/00; A01K 87/02; A01K 87/06; A01K 87/08
USPC ............................ 43/18.1 R, 23, 22, 18.1 CT
See application file for complete search history.

(56) References Cited

U.S. PATENT DOCUMENTS

| | | | |
|---|---|---|---|
| 2,583,831 A * | 1/1952 | Goergen | A01K 87/08 279/49 |
| 3,073,055 A * | 1/1963 | Edwards | A01K 87/08 43/23 |
| 3,121,290 A * | 2/1964 | Brown | A01K 87/02 43/18.1 CT |
| 3,426,466 A * | 2/1969 | Shepherd | A01K 87/08 43/22 |
| 3,820,801 A * | 6/1974 | Lindler | A01K 87/02 279/42 |

(Continued)

FOREIGN PATENT DOCUMENTS

| | | | |
|---|---|---|---|
| CH | 239806 A | * | 11/1945 |
| CN | 205727723 U | * | 11/2016 |

(Continued)

*Primary Examiner* — Darren W Ark
(74) *Attorney, Agent, or Firm* — Hudak, Shunk & Farine Co. LPA

(57) ABSTRACT

A modular component fishing rod system that allows the end user to easily and securely change one or more of the handle portion and rod blank. The system includes a rod blank, rod sleeve assembly and a slide-on handle assembly. The rod sleeve assembly performs at least three functions including: 1) truing up the taper of the fishing rod blank to allow components of the handle assembly to be slid onto the rod blank from the butt end; 2) providing an indexing or key feature which registers with the handle assembly to maintain proper alignment between the handle assembly and rod blank; and 3) providing a method to attach the handle assembly to the rod sleeve. The handle assembly includes a corresponding female sleeve that mates with and preferably slides over the rod sleeve assembly and performs at least three functions including: 1) attaching a handle tube which includes a handle grip and reel seat to a the rod sleeve assembly; 2) matching indexing features; and 3) fixing the handle assembly to the rod sleeve assembly through one of a number of possible fastener assemblies.

19 Claims, 9 Drawing Sheets

(56) References Cited

U.S. PATENT DOCUMENTS

| | | | | |
|---|---|---|---|---|
| 4,067,133 | A * | 1/1978 | Livingston | A01K 87/02 43/18.1 CT |
| 4,467,548 | A * | 8/1984 | Tabor | A01K 97/06 D22/142 |
| 4,738,046 | A * | 4/1988 | Fraylick | A63B 60/12 43/18.1 R |
| 5,263,275 | A * | 11/1993 | Rumbaugh | A01K 87/08 74/551.9 |
| 5,291,683 | A * | 3/1994 | Yamato | A01K 87/06 43/22 |
| 5,355,611 | A * | 10/1994 | Dahlberg | A01K 87/00 43/25 |
| 5,528,848 | A * | 6/1996 | Myojo | A01K 87/002 43/18.1 R |
| 5,974,722 | A * | 11/1999 | Kiser | A01K 97/01 43/18.1 CT |
| 6,115,955 | A * | 9/2000 | Sledge | A01K 87/08 43/23 |
| 6,922,936 | B2 * | 8/2005 | Markley | A01K 87/02 43/18.1 R |
| 7,086,195 | B2 * | 8/2006 | Borgeat | A01K 87/06 43/18.1 CT |
| 7,089,699 | B2 * | 8/2006 | Borgeat | A01K 87/06 43/18.1 R |
| 2006/0230669 | A1 * | 10/2006 | Markley | A01K 87/08 43/25 |
| 2011/0113673 | A1 * | 5/2011 | Huang | A01K 87/08 43/23 |
| 2014/0366327 | A1 * | 12/2014 | Huang | A01K 87/08 16/421 |
| 2015/0208629 | A1 * | 7/2015 | Galhardo | A01K 87/025 43/18.1 CT |
| 2017/0112113 | A1 * | 4/2017 | Huang | A01K 87/08 |
| 2021/0000095 | A1 * | 1/2021 | Cathcart | A01K 97/125 |

FOREIGN PATENT DOCUMENTS

| | | | | |
|---|---|---|---|---|
| DE | 29509717 | U1 * | 10/1995 | |
| DE | 202019105755 | U1 * | 2/2021 | |
| GB | 2587699 | A * | 4/2021 | ........... A01K 87/007 |
| JP | 2006280355 | A * | 10/2006 | |
| JP | 2012010627 | A * | 1/2012 | |
| JP | 6479593 | B2 * | 3/2019 | |
| JP | 2020202779 | A * | 12/2020 | |
| JP | 2021153400 | A * | 10/2021 | |
| WO | 2019221614 | A1 | 11/2019 | |

* cited by examiner

C21b / C21c

MODULAR FISHING ROD SYSTEM

FIELD OF INVENTION

The present invention relates to fishing equipment, more specifically a modular fishing rod system having interchangeable components including a handle assembly, rod sleeve assembly and a rod blank that allow personal customization. The modular system accommodates different types and methods of fishing.

BACKGROUND OF THE INVENTION

One of the biggest inconveniences of fishing is the need for numerous fishing rod configurations for the wide variety of fish species and conditions anglers are confronted with while fishing. For decades, the fishing reel and fishing rod have been modular in their connection, but the handle which is just as, if not more, varied in its need for specific fishing conditions has not often been readily modular in the field. This leads many anglers to collect a large number of expensive rods, each set up for a single application or as generic in nature. This is not only expensive, but space intensive, cumbersome, and repetitive as well.

Currently, most fishing rod handles on the market are applied and adhered to the fishing rod during production, which does not allow the end user/fisherperson to modify their handle in any meaningful way without using an adhesive and/or breaking off the handle to replace it. Presently, most handle components are glued to the tapered rod blank permanently, and if someone desires a different grip or reel seat, they are required to purchase a complete new fishing rod having a different handle assembly.

There are many and various types of fishing rod blanks and handles in the art and, conventionally, each is specific to a particular application. Many of these comprise fish and/or bait specific rod and reel set-ups, such as for bass fishing, walleye, fly fishing, and ocean fishing. Each specific fishing rod, which includes the handle assembly and rod blank set-up is determined at the factory, and the only variables are reel and line choices.

As customization of rods and handles is an expensive and privileged luxury, a vast market segment is ignored and unable to customize their fishing rod blank and handle set-up or change any glued component unless they purchase a whole new rod, or have a rod professional custom build the complete fishing rod according to a particular specification.

Various approaches have been taken in the prior art to address fishing rod configuration:

International Publication WO2019/221614 relates to modular fishing rods which comprise a number of sections of rod that are fitted together. Some form of keying is helpful to ensure that the sections of rod are each aligned correctly relative to one another. However, since the components of the rods are often made of composite material it is often difficult to form a robust keying feature. The reference provides a joint for a modular fishing rod that reportedly includes a robust and simple to align triangular keying feature, with the triangular feature having radiused corners. A butt end of a fishing rod is provided with a socket, with at least a part of the socket having a substantially triangular cross section, and a male end of a fishing rod end module also includes a complimentary substantially triangular keying feature configured to engage with the socket. The joint facilitates the assembly of modular fishing rods for a range of fishing styles.

U.S. Patent Application Publication 2014/0366327 relates to grips and apparatuses and methods of replacing or installing grips on the handle of an article, and in particular for use with golf clubs, fishing poles, bicycle handles, hand tools, etc. Embodiments may include a grip portion and an adaptor butt configured to secure the grip portion to the handle portion of an article.

U.S. Pat. No. 6,115,955 relates to a fishing rod assembly with interchangeable handle components permits different reels, different counterweights or counterweight amounts, and even different rod blank assemblies, to be assembled and used interchangeably with one another for different types of fishing (fly casting, spinning, trolling, etc.) as desired. The handle assembly includes a threaded sleeve which is used to secure various collars and different types of reels thereto. A finger grip or trigger may be installed using these components to provide better casting for certain types of fishing. The rod blank passes through a closely fitting axial passage through the handle assembly, with the butt end of the rod blank assembly protruding slightly from the butt end of the handle assembly. The butt end of the rod blank includes an attachment fitting for a counterweight assembly, with different counterweight assemblies being interchangeably installable to the butt end of the rod blank and handle, or different amounts of weight being interchangeably installable within the counterweight assembly. The rod blank also includes a fitting immovably affixed to the portion adjacent the front of the handle assembly when the rod blank is installed therein, with the fitting mating with a cooperating socket in the front end of the handle assembly to preclude relative axial rotation between the rod blank and the handle assembly when the components are secured together.

U.S. Pat. No. 5,974,722 relates to a combination fishing rod for fishing and ice fishing. The device includes a handle with one end of an elongate support shaft inserted into a hole in one end of the handle. The other end of the support shaft is inserted into a first bore of the first end of an elongate combination insertion member. The second end of the combination insertion member has an elongate second bore therein. The combination insertion member has an annular wall provided in the second bore of the combination insertion member which divides the second bore of the combination insertion member into an annular outer portion and a central portion. The fishing rod also includes a butt shaft and a tip shaft. The first end of the butt shaft is insertable into the outer portion of the second bore of the combination insertion member. The first end of the tip shaft is insertable into the second bore of the second end of the butt shaft and is also insertable into the central portion of the second bore of the combination insertion member.

U.S. Pat. No. 5,528,848 relates to a coupling sleeve for coupling the tip section of a hollow fishing rod to the butt section, which retains the reel. Fore and hind portions of the coupling sleeve serve as joints engageable with the tip and butt sections. The central portion of the coupling sleeve, of greater section modulus of elasticity than the joint portions, has a fishing line guide hole for guiding fishing line from the reel, through a bore connecting the guide hole with a tip socket in the fore joint, and into the hollow tip section of the fishing rod. Further there is at least one additional opening on the exterior of the coupling sleeve central portion, opening to the fishing line guide hole and thus serving to discharge water and debris scraped from the fishing line as it travels through the bore and on the rim of the guide hole.

SUMMARY OF THE INVENTION

In view of above, there is still a need for a modular fishing rod system that allows a user to customize and modify their fishing rod even after purchase, by utilizing the modular design as provided herein. The present invention is much more effective and efficient than the prior art and includes components that are able to be easily and quickly configured and interchanged into a variety of specific set-ups, and including various handle assembly and rod blank combinations, as desired by the user's current fishing needs.

The modular fishing rod system of the present invention provides an alternative to the traditional fishing rod and comprises individual components that can be mixed and matched to create a variety of different fishing configurations to satisfy the various needs of different species fishing set-ups. This is achieved with a fishing rod blank, and a rod sleeve affixed to the large handle end, or butt end of the tapered rod blank. This sleeve conforms to the rod blank taper on the interior or inner surface thereof, and has a standardized cylindrical surface on the outside allowing the handle assembly to slide onto the rod sleeve from the large/butt end of the rod. The handle is held in proper orientation according to the spine of the fishing rod blank, preferably via a series of tabs and corresponding coves within the handle and rod sleeve interaction, similar but not limited to keyed shaft-like features. These keyed like structures allow for the rod blank to be inserted into the handle module either spine up or spine down. The handle is held in place securely via an interaction between the rod sleeve and handle sleeve such as, but not limited to, screws, quick-connection mechanisms, magnets, etc. This versatility and ease of use allows any user to customize their fishing rod configuration on the fly, with far fewer components or space considerations.

More particularly, this invention introduces a modular component design approach where the handle is easily removable, replaceable, or upgradable. The rod blank is also easily removable, replaceable, or upgradable. A half dozen different handles and a half dozen different rod blanks of the present invention can fit easily into a case, cabinet, or closet and replace 36 individual fishing rods, for example.

It is, therefore, an object of this invention and an embodiment thereof to provide anglers with the ability to customize, upgrade, or replace components on their fishing rod easily and quickly. For instance, professional anglers own dozens of fishing rod set-ups for the variety of fishing situations they may find themselves in a tournament. Even if they only use four rods each tournament, they need to own dozens of rods to choose from for each event. The invention allows more anglers to have the wide variety of potential fishing rod set-ups with far fewer complete rods. For example, a user may prefer one rod design over another but he or she may not like the cork handle, rubber, or other material. With the system disclosed herein, switching out fishing rod components on the go is easily performed.

Another object of the invention and an embodiment thereof is to provide a method of accommodating the taper of the rod blank on the handle end to allow for a standardized handle sleeve to slide atop the rod sleeve and be secured in a number of existing fashions including, but not limited to, screw or quick-connect type connections. Said rod sleeves also contain alignment tabs which index into the handle assembly allowing for both spine-up and spine-down orientations.

A further object of the invention and an embodiment thereof is to provide a method to which a pre-configured handle assembly can slide onto a standard sized rod sleeve and be secured in the proper orientation quickly and easily. This modular interaction between the rod and handle provides for a wide range of customization, upgrades, and replacement parts. It allows for anglers to achieve more variety with fewer rods, and allows for beginning or weekend warrior anglers to build up their rod variety one component at a time instead of one complete rod assembly at a time.

A further object of the invention and an embodiment thereof is to provide a standardized system and methods to which DIY home based designers with 3D printers are able to design and print their own handle components that they may use in conjunction with our modular handle and rod sleeve system. From this capability, online communities would be able to share ideas and build methods, creating a larger and more open source method for handle designs and uses.

In one embodiment, a modular fishing rod system is disclosed, comprising a rod blank having a length between a tip and a butt end, and an outer surface; a rod sleeve assembly comprising a tube having a bore with an inner surface, an outer surface, an upper end and a lower end, wherein the bore extends into the tube from at least the upper end, a handle assembly comprising a tube having a bore with an inner surface that extends between an upper end and a lower end, and an outer surface having a reel seat, a rod collar assembly having a bore having an inner surface, wherein the rod blank is extendable through the bore such that the rod blank outer surface is fixable to the inner surface of the rod collar assembly, the rod collar assembly having an outer surface mateable with and fixable to the upper end of the rod sleeve assembly, and a handle collar assembly having a first collar connected to the lower end of the rod sleeve assembly tube, and a fastener assembly, the first collar having a first fitting, and wherein the rod sleeve assembly tube is insertable into the handle assembly tube bore and removably fixable to the handle assembly by connecting the fastener assembly to the handle collar assembly first fitting.

In a further embodiment, the rod collar assembly comprises a first segment and a second segment interlockable around the rod blank.

In an additional embodiment, the rod collar assembly further includes a retainer ring slidable over and mateable with an outer surface of the interlocked first segment and second segment.

In still another embodiment, the inner surface of the rod collar assembly has a taper.

In a further embodiment, the rod blank has a taper hat increases from the tip to the butt end.

In an additional embodiment, the rod sleeve assembly tube outer surface is substantially cylindrical.

In still another embodiment, the handle assembly tube bore inner surface is substantially cylindrical.

In a further embodiment, the rod collar assembly outer surface includes a flange insertable into the rod sleeve assembly tube, such that a flange seat of the rod collar assembly abuts the rod sleeve upper end.

In an additional embodiment, the first segment and the second segment have identical structure, and wherein the first segment and second segment incorporate one or more of interlocking fingers and male and/or female indexing features.

In still another embodiment, the first collar first fitting is threaded and mateable with threads on the fastener assembly.

In a further embodiment, the rod collar assembly is adhered to the rod sleeve assembly tube.

In an additional embodiment, the first collar first fitting is mateable with the fastener assembly through a quick connect fitting.

In still another embodiment, the fastener assembly includes a storage capsule having an interior compartment.

In a further embodiment, the rod sleeve assembly includes indexing features that position the rod blank in a spine up or spine down position.

In an additional embodiment, the first collar is connected to the lower end of the rod sleeve assembly tube by a pin that is inserted substantially perpendicular to an axial direction of the tube.

In still another embodiment, the handle collar assembly has a second collar connected to the upper end of the handle assembly tube.

In a further embodiment, the first collar first fitting is mateable with the fastener assembly via a twist lock mechanism.

In an additional embodiment, the twist lock mechanism includes a spring that cooperates with bearings to hold a nipple of the first collar when the rod sleeve assembly is secured in the handle assembly.

In still another embodiment, the handle assembly further includes an upper grip and a lower grip, with the reel seat being located therebetween.

In a further embodiment, the rod collar assembly outer surface includes a flange insertable into the rod sleeve assembly tube, such that a flange seat of the rod collar assembly abuts the rod sleeve upper end.

These and other objects and embodiments of the invention will become more fully apparent as the description proceeds in the following specification and the accompanying drawings.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
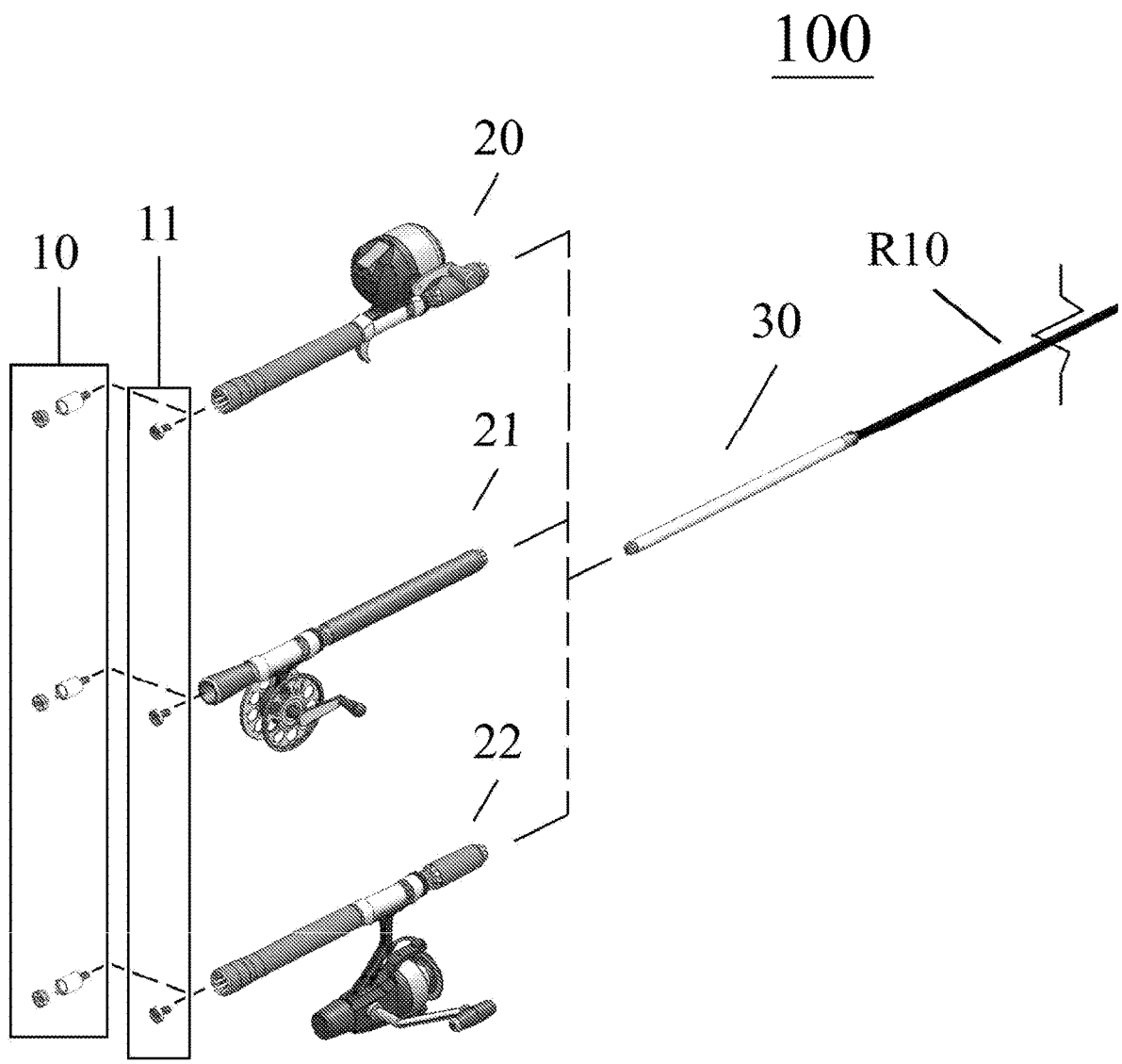
FIG. 1 is a perspective view of one embodiment of a modular system 100 including a fishing rod sleeve assembly 30, various fishing rod handle configurations 20, 21, 22, and fastener assemblies 10, 11, in particular a thumb screw, and capsule options.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The modular fishing rod system includes components that can be easily and quickly assembled into a fishing rod having a desired configuration in order to meet the user's current fishing situation. The system can be disassembled just as easily in order to reconfigure the fishing rod, if necessary. The fishing rod system generally comprises one or more and preferably two or more rod blanks, a rod sleeve assembly, one or more and preferably two or more handle assemblies, a rod collar assembly and a handle collar assembly that are each described in detail herein. The rod collar assembly generally connects the rod blank to the rod sleeve assembly (preferably at the factory as a permanent attachment). Similarly, the handle collar assembly connects the rod sleeve assembly to the handle assembly in a semi-permanent removable fashion. The connections between the rod sleeve and handle sleeve components are not permanently fixed so that two or more different rod blanks can be utilized with a particular handle assembly or different handle assemblies can be utilized with a particular rod blank, and so on, thereby providing and allowing personal customization of a fishing rod.

The rod blanks of the present invention are flexible, elongate, and generally cylindrical or conical in shape which are connected to the appropriately sized rod sleeve assembly, usually as a permanent connection. Each rod blank has tip and a base and/or butt end. In most embodiments the rod blank increases in taper from the tip to the butt end. In other embodiments, portions of the rod blank may not taper along a length thereof, such as along a length of the butt end.

The length of each rod blank may vary and the modular fishing rod system of the invention can be provided with multiple rod blanks of different lengths. Similarly, different rod blanks may have different degrees of flexibility or stiffness, as known to those of ordinary skill in the art. Different segments of each rod blank may vary in stiffness in order to impart the desired action to the rod blank. Each rod blank has a spine to which some anglers prefer facing upward, and others prefer facing downward making the rod blank perform stiffer or softer.

In additional embodiments the rod blank may be constructed of two or more interconnectable pieces which aids in collapsing the rod blank for travel, storage or the like. Also, some rod systems comprise of telescoping rod segments to allow for condensed transport. As known in the art, a plurality of line guides can be present on an outer surface of the rod blank.

The rod sleeve assembly is typically a rigid, elongate tapered cylinder, cone or tube having a bore, preferably extending between the tube upper end and tube lower end. The outer surface of the rod sleeve is preferably cylindrical. The rod sleeve has an outer diameter that is smaller than, and fitted to the diameter of the bore of the handle assembly, such that the rod sleeve can be inserted into the handle assembly a desired depth and subsequently connected thereto.

The rod sleeve bore accommodates at least one section of the rod blank toward the butt end of the rod blank. The rod blank is preferably fully inserted into the rod sleeve to the greatest extent possible to maintain the maximum "touch" or "feel" for the angler. The rod sleeve can be made as a singular component, or as assemblies of function-based sub-components, both of which perform the same once adhered to the rod blank. The function-based sub-components can be separated into three, the butt end cap, the tubular sleeve, and the split or non-split indexing collar. The end cap has several functions and is preferably the same size or larger than the rod blank butt end. One of the functions of this cap is to keep the rod blank centered within the rod sleeve even if the rod blank is smaller than the rod sleeve interior bore via a conical mating feature on the rod blank side. The second function is to attach the bridging tubular sleeve via methods including, but not limited to, an adhesive and/or a dowel pin. The third function is to mate the end cap tightly and centered within the handle tube sleeve. The fourth (but not last) function is to accept the threaded connector used to secure the rod sleeve to the handle sleeve.

The tubular sleeve also has multiple functions, the first being bridgework to attach both the end cap and the split or non-split collar. The second function is to hold the end cap on the end of the assembly. The rod blank butts against the end cap and the sleeve tube covers the rod blank, the end cap, and the split or non-split collar securing these components to one another at a set distance to match the geometry of the corresponding handle sleeve. The third function is decorative and for product labeling.

The rod collar such as the split collar or non-split collar also has a number of functions not limited to the following. The rod collar is indexes into the corresponding features in the handle sleeve assemble in order to maintain proper rotational orientation with the handle sleeve assembly. The rod collar also provides a positive stop such that the handle sleeve assembly does not over-travel into the handle sleeve. The rod collar also indexes to the sleeve tube as a permanent attachment. Lastly, the rod collar mates closely on the interior surface as to match the taper of the rod blank at the position where this collar is adhered. The split version of the rod collar is required when attaching this collar to a rod blank that has already had the line guides attached. The split collar can be made identical such that production is simplified, and can therefore be attached in place rather than slid over the small end of the rod blank. These three components are assembled as they are applied to the rod blank in a permanent fashion, but could be combined in a fashion to reduce part count without compromising functionality.

The handle assembly comprises a tube having a bore with an inner surface that extends between an upper end and a lower end. The outer surface of the handle assembly includes a reel seat to allow a plurality of different reels to be individually connected to the handle assembly. The handle assembly may include a padded or cushioned grip on one or more sections of the outer surface thereof. Different materials can be utilized as known in the art.

While the exterior of the handle sleeve assembly may be indistinguishable from contemporary handle configurations used widely across the industry, it is the interior features of this handle sleeve that make this system unique. The interior functions of the handle sleeve assembly are as follows. As with the rod sleeve assembly, the functions can be separated into function-based sub-assemblies including an end cap or fastener assembly, handle sleeve tube, and indexing collar.

The end cap acts as a stop and accepts the rod sleeve end cap centered within the handle sleeve and having a bore passage which allows for a threaded connector to pass through to the rod sleeve end cap internal connecting threads. The end cap also allows accommodation to affix permanently to the handle sleeve tube. The end cap can also act as a cover to the end of the handle grips, allow for attachment of decorative end caps and provide for a secured connector that is embedded in a way as to not unthread while in use.

The handle sleeve tube also performs multiple functions not limited to an attachment bridge spanning from the end cap to the indexing collar, making them set at a distance and rigidly placed to match with the geometry of the rod sleeve assembly. This tube is the framework to which the grip and reel seat components are attached.

The indexing collar is attached to the handle sleeve tube at the rod end and oriented in such a way as to align the handle properly when the rod sleeve is inserted into the handle sleeve assembly. The indexing collar can have a number of indexing configurations, and two symmetrical features allow for the rod sleeve to be inserted into the handle sleeve either spine-up or spine-down. This is an important feature when modular line guide loops are provided which allow even more customization and an order of magnitude of the number of possible configurations from a minimal collection of components.

As an overview, the handle sleeve assembly is configured in such a way as to accept a number of similarly configured rod sleeve assemblies securely and properly oriented as well as allow for ease of outfitting the exterior of the handle tube with grips, reel seats, and decorative items. In a quick-connection configuration, the handle sleeve contains features as to accept a modified rod blank sleeve end cap with a quick-connect type male fitting.

The rod collar assembly facilitates connection between the rod blank and the rod sleeve assembly. The rod collar assembly has a bore having an inner surface. The rod blank is extendable through the bore such that the rod blank outer surface is able to be fixed to the inner surface of the rod collar assembly. The rod collar assembly has an outer surface mateable with and interconnectable to the upper end of the rod sleeve assembly. In one embodiment the rod collar assembly is a single piece component, and is generally cylindrical. In other embodiments the rod collar assembly comprises two or more components. In a particularly preferred embodiment the rod collar assembly comprises a first segment and a second segment interlockable around the rod blank. The rod collar assembly can include a retainer ring slidable over and mateable with an outer surface of material first and second segments to maintain the interlocked relationship between the segments. This split collar configuration is required when outfitting a rod blank that has line guides in place, disallowing the collar from being slid over the tip end of the rod blank.

The inner surface of the rod collar assembly has a taper in an embodiment where the rod blank is provided with a taper. Providing matching tapers between the rod collar assembly and the rod blank prevent axial movement between the rod collar assembly and the rod blank when the components are connected in the fishing rod system. By the inherent nature of a slightly tapered rod blank, the rod collar has a range of positions to which it securely attaches to the rod blank while accommodating different length handle lengths.

A fastener assembly is utilized to operatively connect the rod sleeve assembly to the handle assembly. Preferably after connection of the rod sleeve and rod blank, the rod sleeve lower end is inserted into the upper end of the handle assembly. The rod sleeve is inserted a sufficient depth such that the fastener assembly can be connected to the collar or other fitting provided at the lower end of the rod sleeve. The fastener assembly has a construction such that the rod sleeve is locked in the handle tube securely, for example until the connection is desired to be reversed so that a different modular combination can be created. As described further hereinbelow, the fastener assembly can include various options such as threaded connections, quick connections or the like.

With reference now to the drawings, wherein identical or like parts are shown utilizing the same reference numbers, FIG. 1 is a perspective view of one embodiment of a modular fishing rod system 100, consisting of a rod blank R10, rod sleeve assembly 30, multiple handle assembly configurations (21, 22, 23), and alternative fastener assemblies 10 & 11. Rod sleeve assembly 30 is shown connected to a fishing rod blank R10. Rod sleeve assembly 30 has a purpose of removing the taper of the rod, providing an indexing feature for the handle sleeve (20, 21, 22), and is removeably connectable to the fastener assembly (10, 11). Handle assembly 20, 21, & 22 represent handle modules that are interchangeable with the rod sleeve assembly 30. Each handle assembly can be customized to be useful for a specific fishing task, wherein handle assembly 22 is configured with a bait casting reel, handle assemble 21 is configured with a fly fishing reel and handle assembly 22 is configured with a spinning reel.

Rod sleeve assembly 30 having rod blank R10 connected thereto is inserted into handle assembly 20 and operatively connected thereto by the fastener assembly 10 or 11. Fastener assembly 10 includes a threaded male fitting that is connectable to a female receptacle on rod sleeve assembly 30. Similarly, fastener 11 is a thumb screw having a threaded male fitting that can mate with female receptacle of rod sleeve assembly 30 thereby connecting rod sleeve 30 and rod blank R10 to one of the handle assemblies. The fastener has an additional segment such as a head that securely locks the handle assembly to the rod sleeve 30. The fastener assembly can utilize other fastening connections to connect to rod sleeve 30, such as a quick connect assembly, magnet, or the like. Fastener assembly 10 is shown including a capsule or compartment that can be utilized for storage of fishing equipment such as hooks, bobbers, lures, or the like. The capsule is shown including a cap that can be secured to the capsule container for securing items therewithin.

Figure 2:
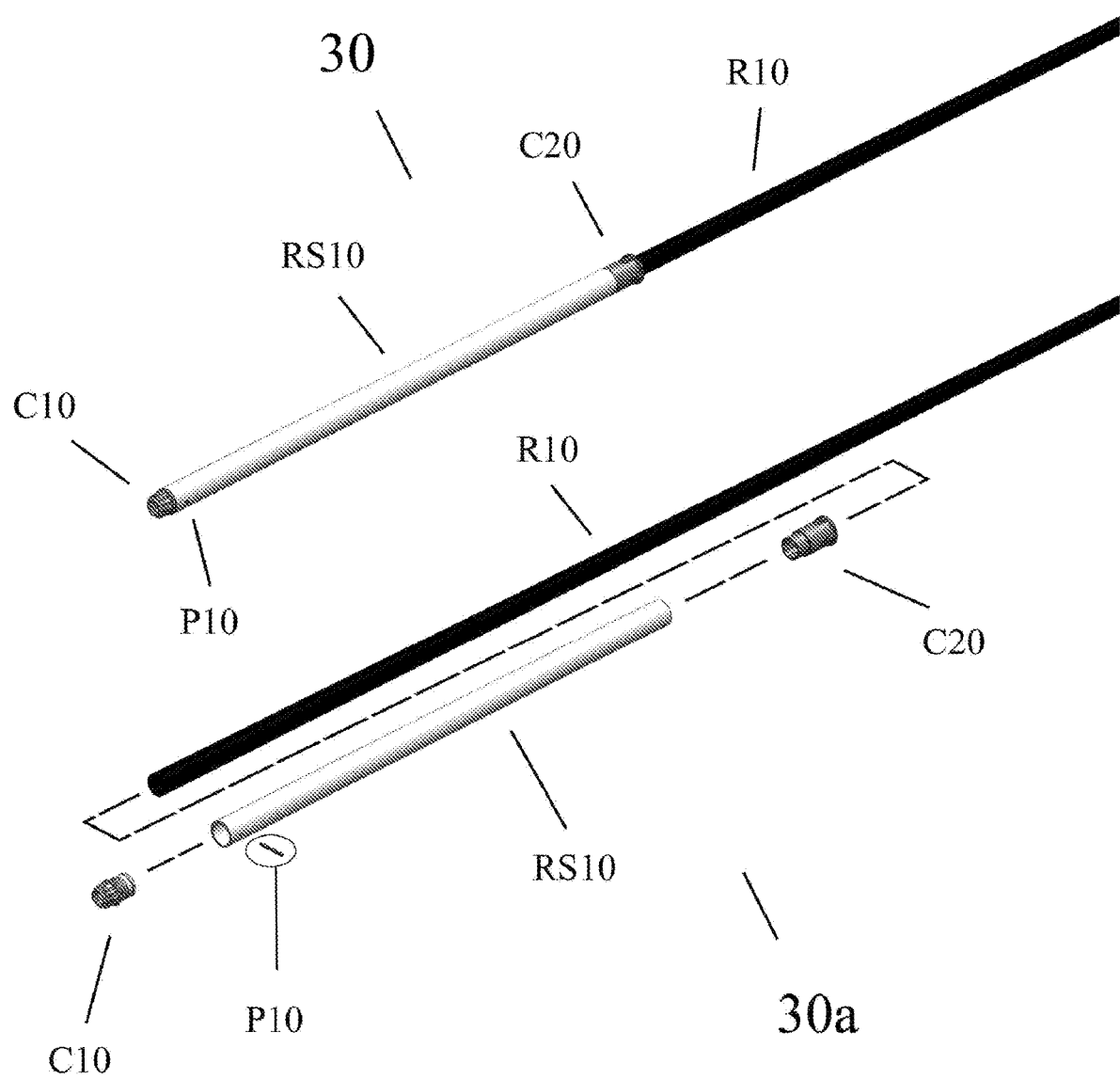
FIG. 2 is a perspective view of one embodiment of a rod sleeve assembly showing an assembled device and an exploded view showing individual components.

FIG. 2 is a perspective view of an example of a rod sleeve assembly 30 with rod blank R10 assembled thereto and also exploded 30a to show individual components thereof. Rod blank R10 represents a fishing rod of any material that has the fishing lines guides attached or a bare fishing rod or tapered rod. Collar C10 illustrates a device for accepting and mating with fastener assembly 10, 11.

Rod collar assembly C20 has an interior wall that matches the taper of the rod blank R10, and has a flange for adhesive or a threaded attachment to rod sleeve RS10. Rod collar assembly C20 also incorporates indexing features corresponding to rod sleeve RS10. Rod sleeve R10 is preferably a cylindrical tube that accepts at least a portion of collar C10, and pin P10. Collar C10 is secured to rod sleeve RS10 via pin P10 which is generally inserted through the components transverse to the longitudinal axis of rod sleeve RS10. Separating the components allows for ease of manufacturing, such that common parts C10, C20, and P10 can be used with a variety of rod sleeve lengths.

Figure 3:
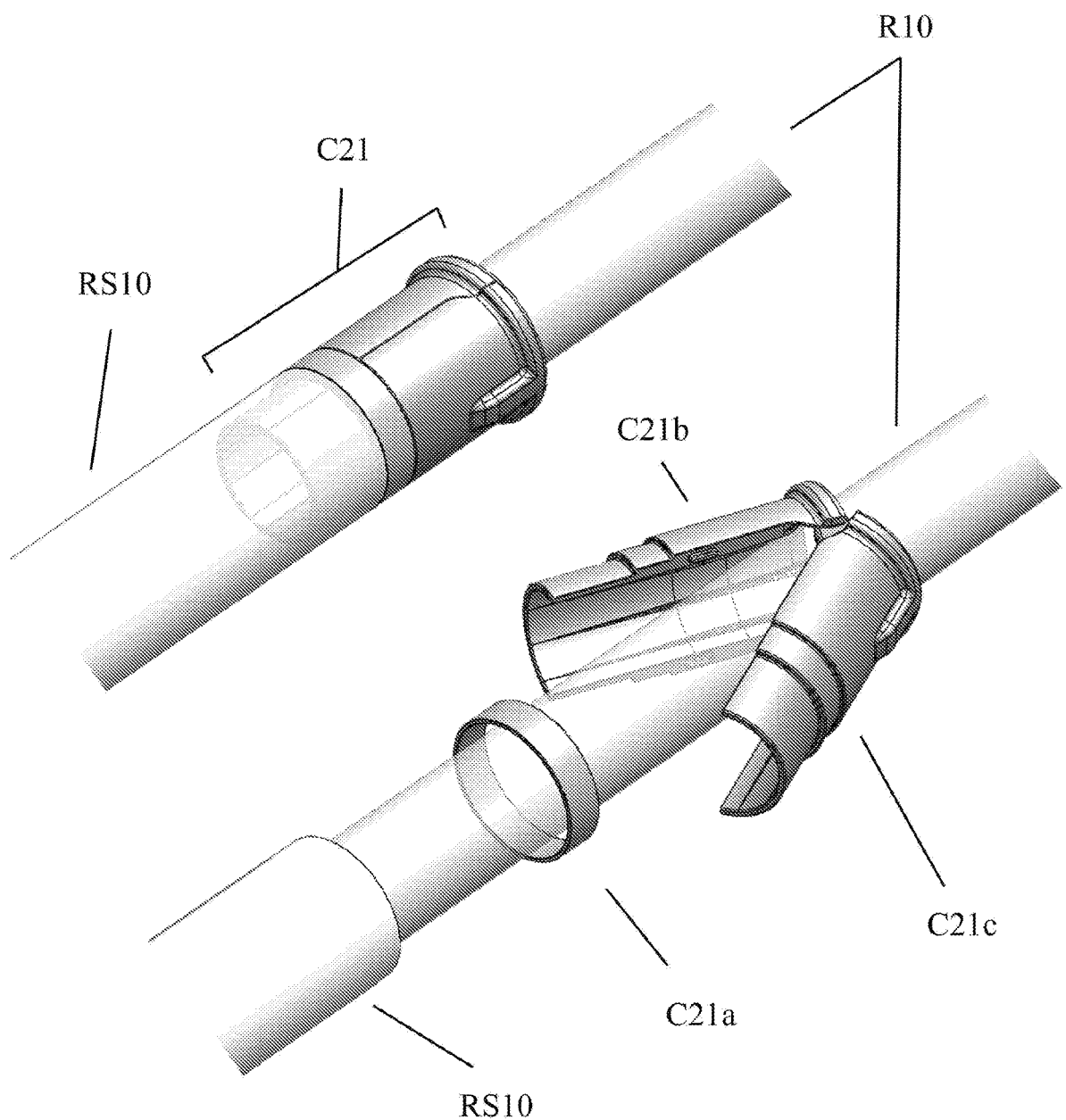
FIG. 3 is a perspective view of a fishing rod collar assembly C21 show in a split format where the split parts are identical and how that assembly secures to a fishing rod.

FIG. 3 is a perspective view of rod collar C21 shown in FIG. 2 which is split into two parts, shown as identical halves, C21b, C21c and with a retainer ring C21a such that this component can be attached to the fishing rod blank R10 after the fishing rod line guides are permanently attached using traditional, r other methods, without sliding a single piece rod collar C20 over the tip of the fishing rod and down onto the rod blank R10. This embodiment allows for rod collar assembly C21 to be assembled onto fishing rod blanks R10 that already have the guides attached.

Once the handle length is determined, the fishing rod collar assembly C21 can be attached directly to the correct position on the fishing rod blank R10. First and second segments C21b, C21c are preferably identical interlocking half tube collars that, once together and secured or adhered with retaining ring C21a, the rod sleeve RS10 can be slid on from the butt end of the rod blank and secured to the flange on rod collar assembly C21. Rod Sleeve RS10 is preferably permanently adhered to the flange of the split collar assembly. This assembly of end cap, rod sleeve and split collars form an adhered assembly that engulfs the butt end of the rod blank disallowing the rod to exit with geometry and with adhesives.

Figure 4:
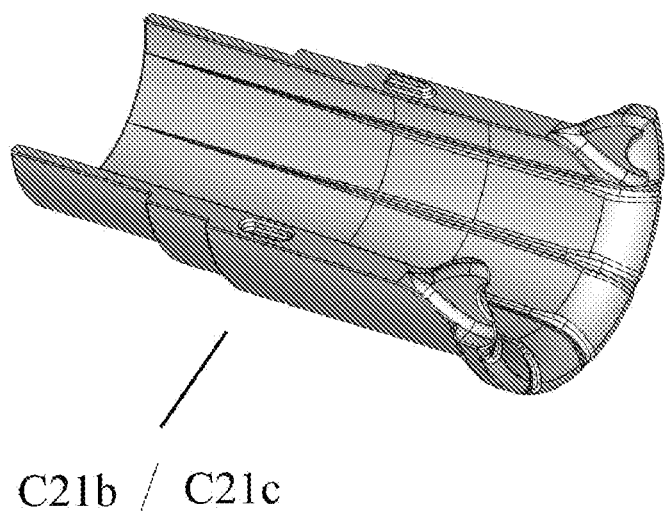
FIG. 4 is a perspective view of a fishing rod collar segment C21*b*. This component is an alternative to a fishing rod collar assembly C20 and allows this collar to be attached to the fishing rod blank without the need to slide the rod collar assembly over the tip end of the rod blank.

FIG. 4 is a perspective view of the segments C21b, C21c from FIG. 3. They include interior surfaces that match the taper to fishing rod blank R10 and include interior flutes that aid in the adhesive retention to the fishing rod blank R10. Two of these split collars are to be permanently adhered to the rod blank in the position appropriate to accept the corresponding handle sleeve assemblies. A retaining ring C21 a can be used as an intermediate securing method, and the rod sleeve RS10 then is adhered to the secondary flange of the segments C21b, C21c locking the assembly together securely and permanently. The critical advantage of the split segments 21b, 21c is apparent when the rod blank has guides installed, which disallows components from being installed to the rod from the tip end. The collar matching the taper of the rod blank at a distance from the butt end of the rod would make it geometrically impossible to install a non-split collar to an existing rod or a rod with line guides attached. The edges of first segment C21b and second segment C21c incorporate interlocking fingers and male and/or female indexing features to secure the halves together. The exterior surfaces include indexing features for handle assembly 20, 21, 22, motion stop features for handle sleeves, accommodations for a retaining ring C21a, and rod blank R10. This component closely approximates the taper and size of the fishing rod blank.

Figure 5:
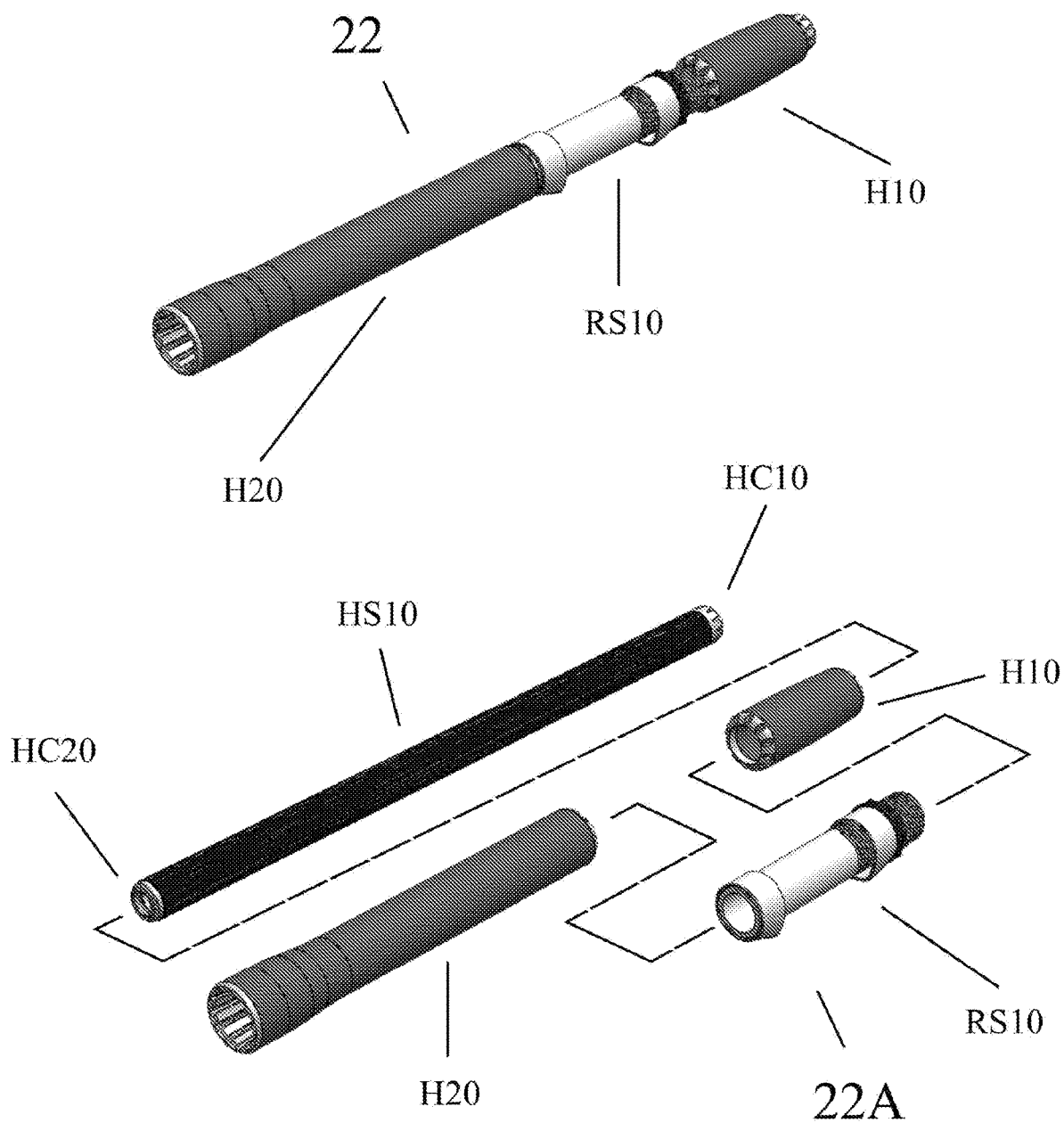
FIG. 5 is a perspective view of a handle sleeve assembly shown in assembled and exploded views.

FIG. 5 is a perspective view of the handle assembly 22 of FIG. 1 assembled and exploded 22A to show common components that are normally adhered or connected directly to a fishing rod. Rather than adhere the common fishing rod handle components to the rod, in this invention, they are applied to the handle tube HS10. Common handle assembly components include, but are not limited to, front grip H10, reel seat RS10, and rear grip H20 which is shown with a flared butt end to accommodate fastener assembly 10, 11. The handle sleeve tube HS10 is cylindrical so the handle components may be added from either end, unlike attaching the same components to a traditional tapered fishing rod from the tip end prior to the attachment of the line guide array. Grip and reel seat components are considered any/all existing handle components as well as future grip and reel seat component parts including but not limited to electronics and battery storage devices. As the digital age advances, many electronic devices are becoming commonplace due to their small size and added capabilities. Special handles could be outfitted with battery storage components as well as electronics such as sensors and Bluetooth type wireless connections to one's smart phone. This would allow for programs or apps that could for example sense and alert you when a fish bites the bait, or add lights and illuminated decor to the handle and/or rod.

Figure 6:
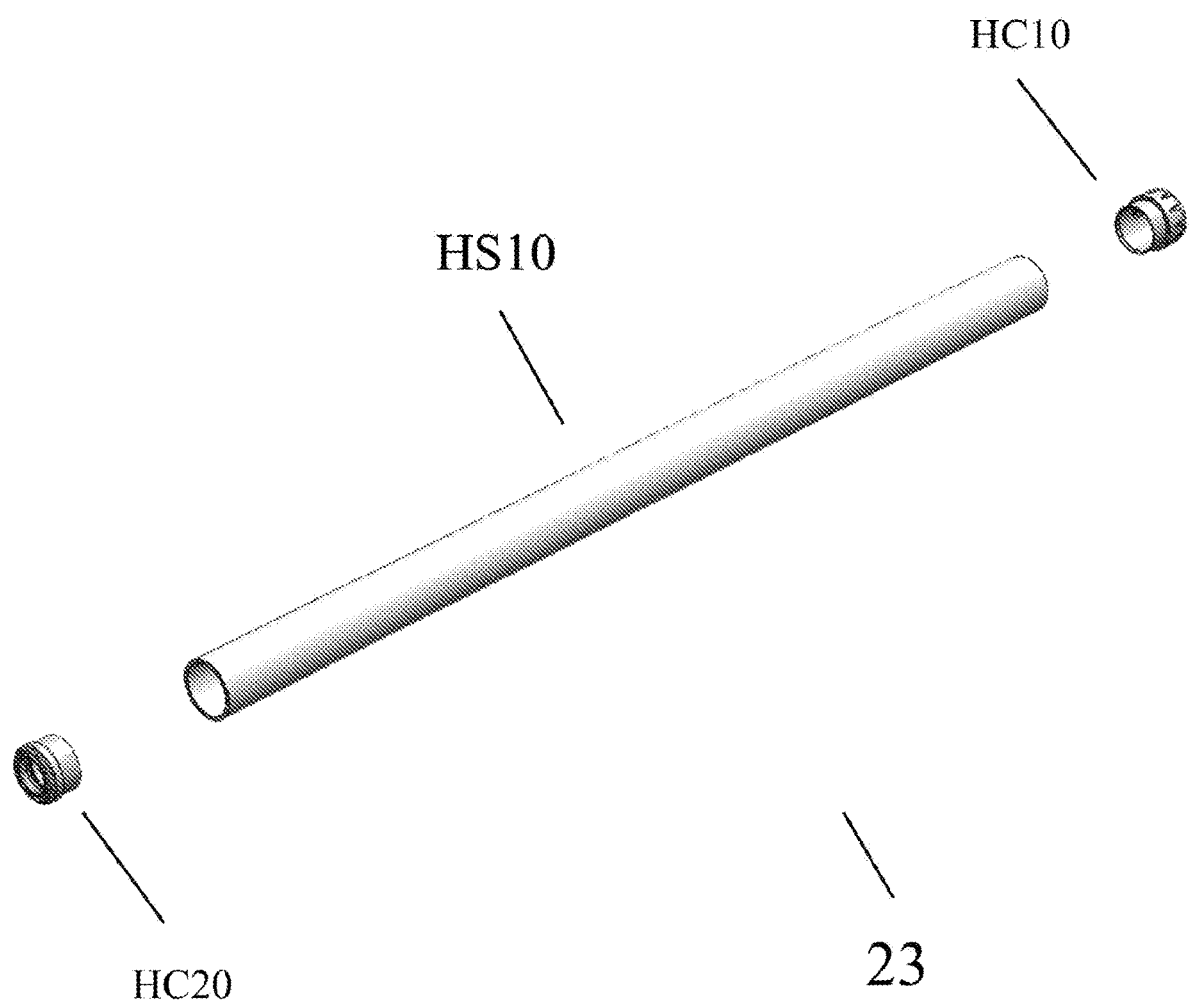
FIG. 6 is a perspective view of a modular handle sleeve base tube shown in exploded view.

FIG. 6 is a perspective view of a further embodiment of a handle assembly 23 including a tube HS10, tube upper collar HC10, and tube lower collar HC20, which can be a modular assembly as shown. Alternatively, any or all of the components may be combined to reduce part count. The assembly 23 is a common component that can be produced as a blank handle sleeve and be sold to rod builders or individuals such that they may add the handle grips and reels seats that they choose. Upper collar HC10 is a collar that includes the indexing features like the rod collar C20 in FIG. 2 as well as flange accommodations to adhere a rod sleeve RS10. Lower collar HC20 is a plug end for tube HS10 with a flange that matches the size of the rod blank R10 on FIG. 2 butt end which accepts collar C10 in FIG. 2 and has access port that allows fastener 10,11, or equivalent to be coupled to rod sleeve R10. Tube HS10 may be a thin carbon fiber tube that may be laser or CNC etched as an example, or lightweight metal with anodizing or other decorative finishes. This component may be cut to size allowing these three components, namely, upper collar HC10, lower collar HC20, and tube HS10 to become common parts that are capable of creating a number of different style handle sleeves, thus reducing production costs. Changing the length of sleeve tube HS10 changes the length of the handle sleeve assembly allowing common end fittings that accommodate any length handle 23 by cutting the tube HS10 to the desired length.

Figure 7:
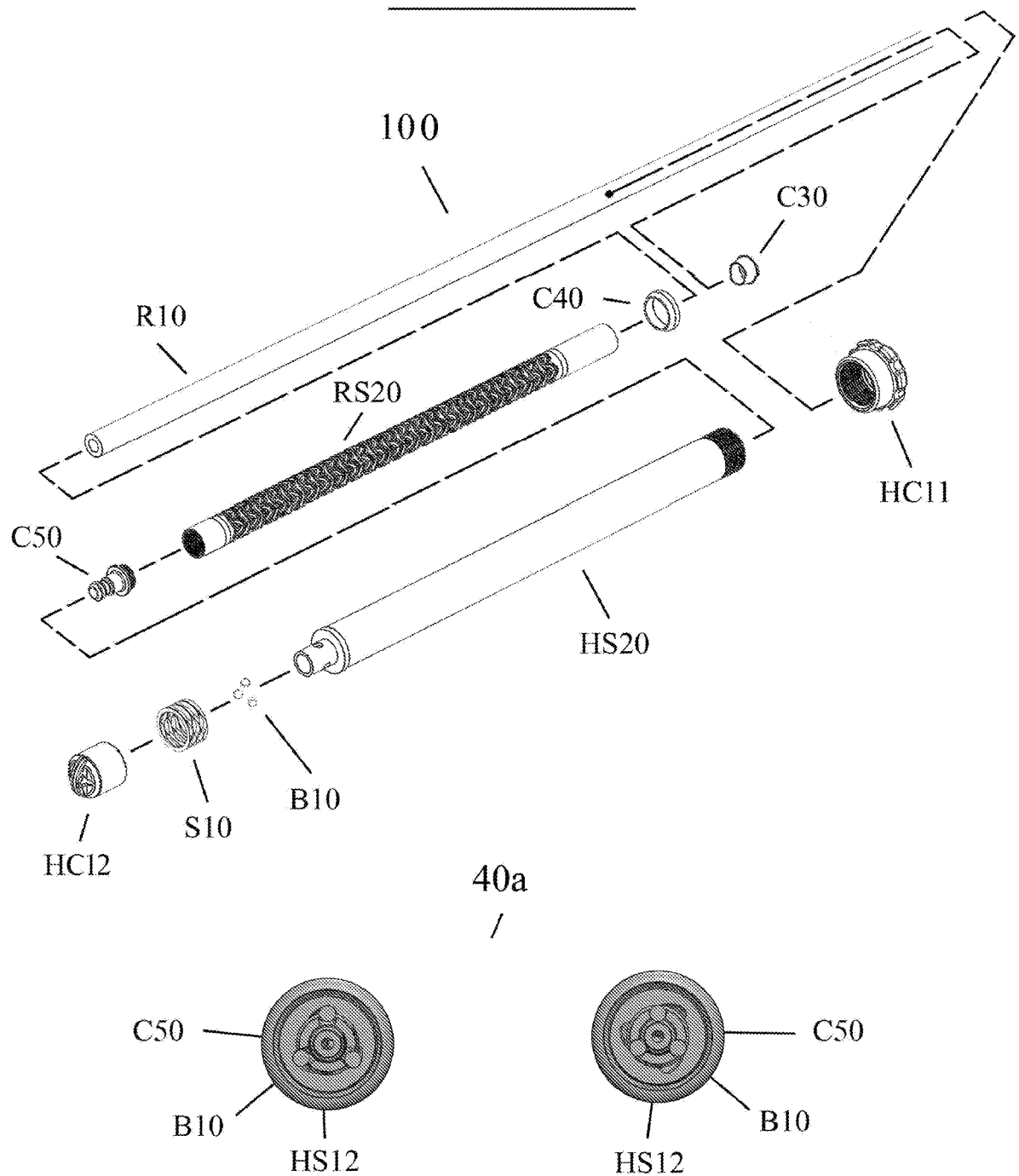
FIG. 7 is a perspective exploded view of one embodiment showing components used to create a fishing rod having a removable handle assembly with a quick connection system.

FIG. 7 is a perspective view of an alternate configuration of a modular fishing rod system 100. Fishing rod blank R10 represents any and all available blank or bare fishing rods. Rod sleeve RS20 is a formed or additive manufactured rod sleeve with a threaded or equivalent proximal end that accepts rod sleeve collar C50, and a chamfered distal end that accepts rod sleeve collar C30 making the rod sleeve assembly 50 (FIG. 8) a permanent tight fitting, rattle free assembly. Collar C40 is press fit over the rod sleeve RS20 structure as to provide a tapered wedge shape that interacts with the tapered interior distal end of handle sleeve HS20. Collar C40 can also be incorporated into the shape of the rod sleeve tube as a single component. Rod sleeve RS20 may be manufactured in various lengths while maintaining compatibility with rod sleeve collars C30, C40, and C50. Quick connect male fitting collar C50 has a male quick connect type nipple on the proximal end and threaded and is sized to match corresponding thread pattern or an inner surface of rod sleeve RS20. Swage collar C40 is applied to the rod sleeve RS20 to bridge any difference in diameter between the rod sleeve RS20 outer diameter and the handle tube HS20 inner diameter. Swage collar C40 is adhered or press fit to rod sleeve RS20. Collar C30 bridges the difference in diameter of the fishing rod blank R10 compared to the inner diameter of cylindrical sleeve RS20. Both collars C40, C50 make the components of the modular system fit snugly and not rattle.

The handle sleeve assembly of FIG. 7 has a couple of additional features as compared to FIG. 6 including, but not limited to, a quick connect feature as well as a secondary rod sleeve retention handle collar HC11. The fastener assembly HC12 that connects handle tube HS20 to rod sleeve RS20 includes a quick connect fastener HC12 that is a push/pull or a twist lock quick release cover that is spring loaded and includes spring S10, and actuates bearings B10 to hold the nipple of collar C50 when the rod sleeve RS20 is secured in the handle tube HS20. Spring 510 is a torsion or compression spring which actuates fastener HC12. Bearings B10 retain the rod sleeve RS20 inside of the handle tube H520. Handle tube HS20 includes a component that has an accommodation for the quick connect fastener assembly HC12 and to house and retain the bearings B10. Tube HS20 also has an interior diameter just larger than the exterior diameter of rod sleeve 8520 and is preferably only slightly larger such that there is no lateral movement perpendicular to the axial direction of rod sleeve RS20 and handle tube HS20. Handle tube H820 is fitted with handle grip and reel seat components on the exterior surface thereof, for example as shown in FIG. 5. The distal rod blank side end of handle tube H520 has threads to accept and connect to handle collar HC11. Handle collar HC11 is fitted to the rod from the tip end and restricts the rod sleeve assembly 50, see FIG. 8, from exiting the handle tube HS20 during fishing. Adding a lateral slot into collar HC11 will allow for the collar to be fit to the rod blank R10 without sliding it over the tip end of the rod, or applied after the guides have been added to the fishing rod. Cross-sections 40a depict the rotational locking quick connection configuration, showing locked and unlocked positions.

Figure 8:
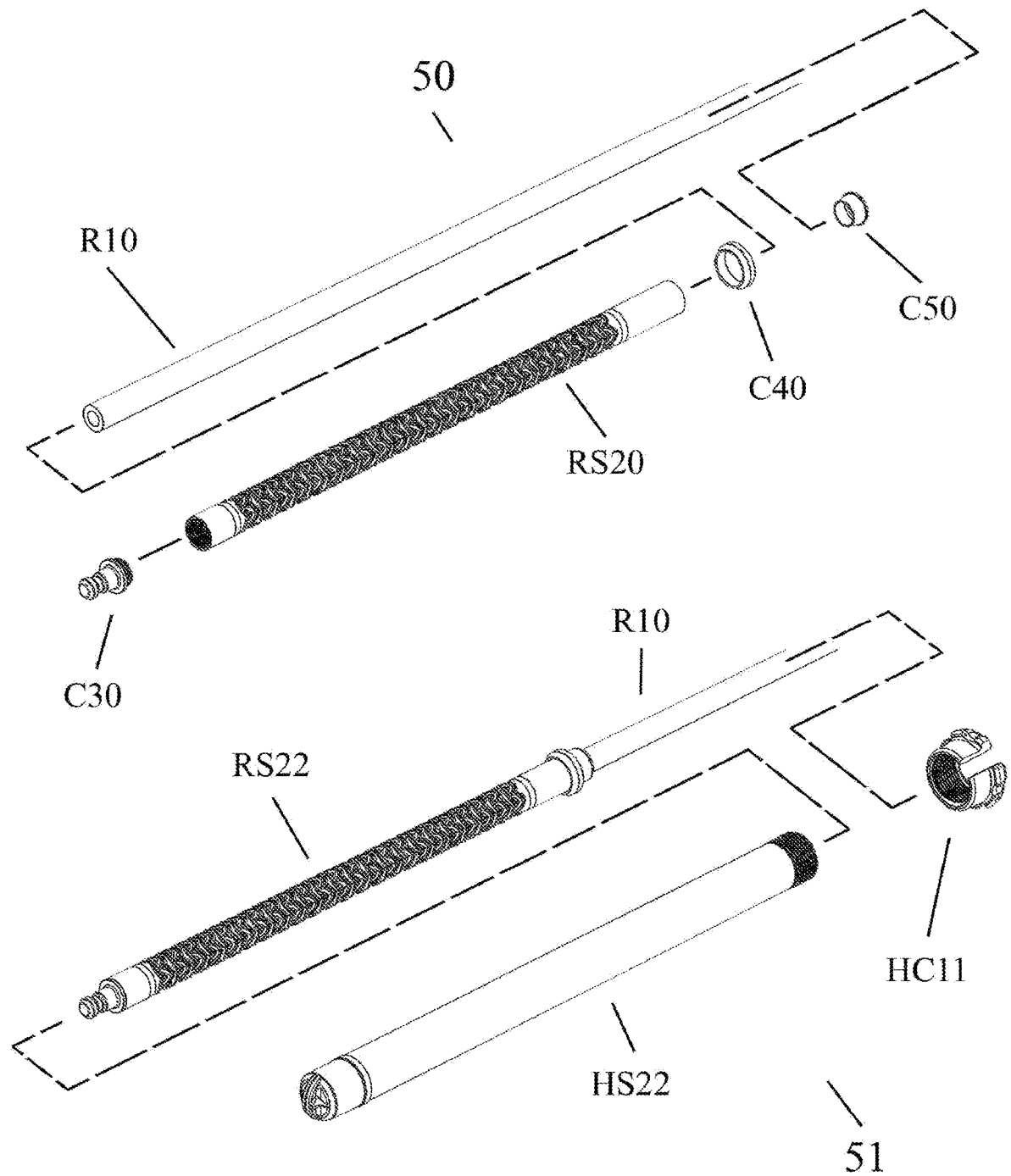
FIG. 8 is a perspective exploded view showing the arrangement and assembly of the components shown in FIG. 7.

FIG. 8 is a perspective view of the assembly shown in FIG. 7 showing, in two steps 50 and 51, the manufacturing of the rod sleeve assembly, and the attachment of the assembled handle sleeve attachment to the rod sleeve assembly. Assembly step 51 depicts the completed assembly 50, and shows how the tube HS22 attaches to the rod sleeve RS20 from the proximal end of the fishing rod followed with handle collar HC11 that is a secondary retainer of the fishing rod to the handle.

Figure 9:
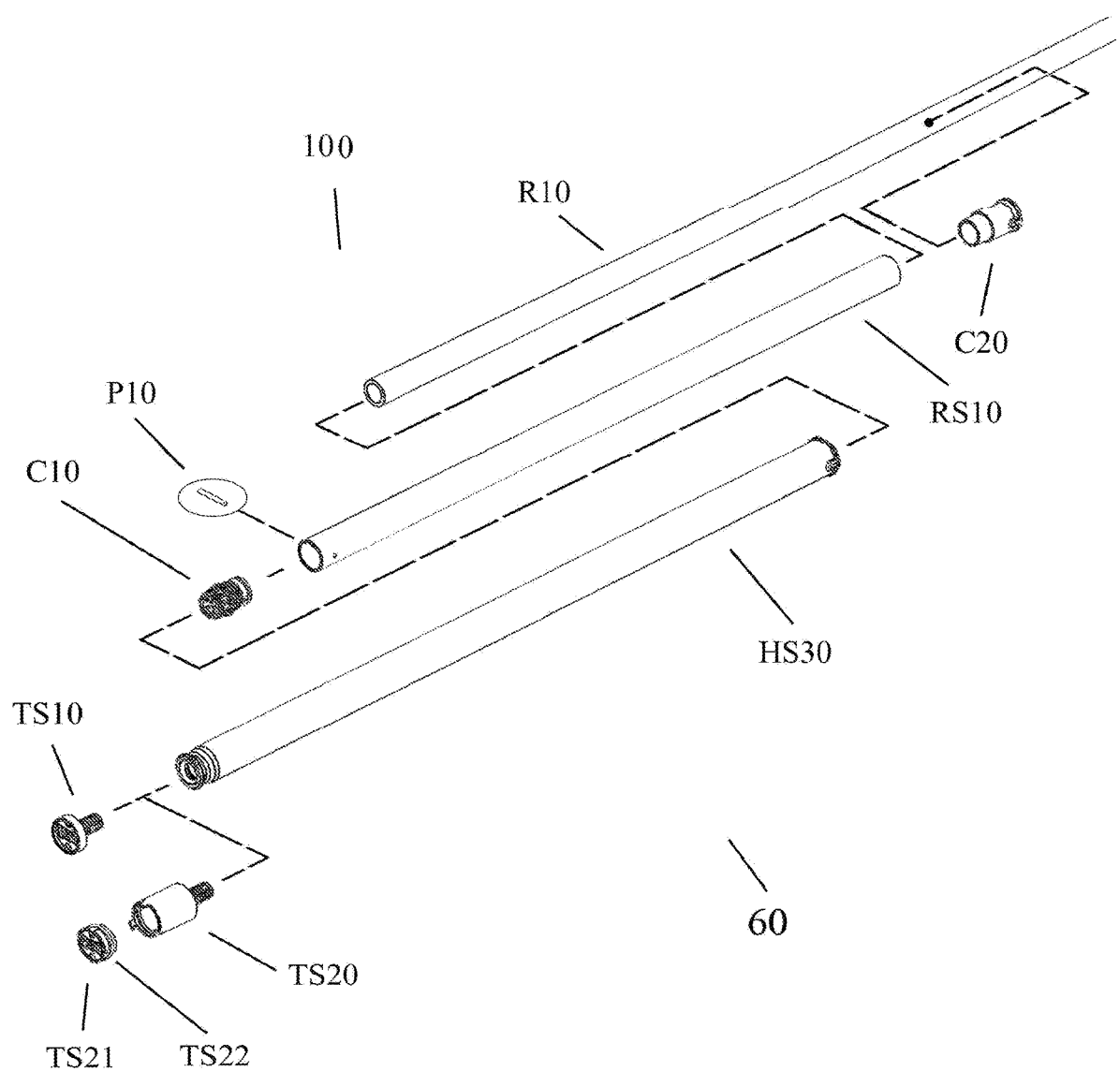
FIG. 9 is a perspective exploded view showing the arrangement and assembly of the components show in FIG. 7 utilizing a single piece drawn tube for the handle assembly in FIG. 7.

FIG. 9 is a perspective view of a third configuration of modular fishing rod system 100 which includes a single piece handle tube HS30 that is additive manufactured or a drawn tube for example. FIG. 9 also depicts two of many possible attachment/securing methods to retain the handle tube HS30 to the rod sleeve assembly which includes RS10, collar C10, C20 and pin P10. Fastener TS10 is a thumb screw that is threaded into collar C10 of the rod sleeve RS10 through the port located at the proximal end of handle tube HS30. An O-ring may be used in the proximal end of the handle tube HS30 to add a compression lock for the threaded components such as TS10, TS20. Fastener TS20 is a capsule with a threaded rod end that matches the thread pattern in collar C10, used to secure the rod sleeve RS10 to the handle tube HS30. Components TS21, TS22 are shown as a lid and O ring that create a watertight lid for small item storage such as extra hooks in the compartment of fastener TS20. Various other threaded screw features may included, for example, a multi-tool or a light.

For the avoidance of doubt, the products and device of the present invention encompass all possible combinations of the components, including various ranges of said components, disclosed herein. It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

In accordance with the patent statutes, the best mode and preferred embodiment have been set forth; the scope of the invention is not limited thereto, but rather by the scope of the attached claims.

What is claimed:

1. A modular fishing rod system, comprising:
   a rod blank having a length extending between a tip and a butt end thereof, and an outer surface;
   a rod sleeve assembly comprising a tube having a rod sleeve bore defining an inner surface of the rod sleeve assembly tube, an outer surface, an upper end and a lower end, wherein the rod sleeve bore extends into the tube from at least the upper end,
   a handle assembly comprising a tube having a handle assembly tube bore defining an inner surface of the handle assembly tube that extends between an upper end and a lower end of the handle assembly tube, and an outer surface having a reel seat,
   a rod collar assembly having a rod collar bore defining an inner surface of the rod collar assembly, wherein the rod blank is extendable through the rod collar bore such that the rod blank extends into the rod sleeve bore and the rod blank outer surface is directly fixable to the inner surface of the rod collar assembly, the rod collar assembly having an outer surface mateable with and fixable to the inner surface of the upper end of the rod sleeve assembly tube, the rod collar assembly comprising a first segment and a second segment, each of the first segment and the second segment having edges extending along a length of each of the first segment and the second segment, wherein the first segment and the second segment being interlockable with each other around the rod blank by abutting the edges of the first segment with the edges of the second segment so as to define the rod collar bore therebetween, and
   a handle collar assembly having a first collar directly connected to the lower end of the rod sleeve assembly tube, the first collar having a first fitting, and
   a fastener assembly including a fitting connectable to the first fitting, and
   wherein the rod sleeve assembly tube is insertable into the handle assembly tube bore and removably fixable to the handle assembly by connecting the fastener assembly fitting directly to the handle collar assembly first fitting.

2. The modular fishing rod system according to claim 1, wherein the rod collar assembly further includes a retainer ring slidable over and mateable with the outer surface of the rod collar assembly defined by the interlocked first segment and second segment.

3. The modular fishing rod system according to claim 2, wherein the inner surface of the rod collar assembly has a taper measured from a first end of the rod collar assembly to a second end of the rod collar assembly.

4. The modular fishing rod system according to claim 1, wherein the first segment and second segment incorporate one or more male and/or female indexing features that facilitate the interlocking.

5. The modular fishing rod system according to claim 1, wherein the rod blank has a taper that increases from the tip to the butt end.

6. The modular fishing rod system according to claim 1, wherein the rod sleeve assembly tube outer surface is substantially cylindrical.

7. The modular fishing rod system according to claim 6, wherein the handle assembly tube inner surface is substantially cylindrical.

8. The modular fishing rod system according to claim 7, wherein the rod collar assembly outer surface includes a portion insertable into the rod sleeve assembly tube, such that a seat of the rod collar assembly abuts the rod sleeve tube upper end.

9. The modular fishing rod system according to claim 1, wherein the rod collar assembly outer surface includes a portion insertable into the rod sleeve assembly tube, such that a seat of the rod collar assembly abuts the rod sleeve tube upper end.

10. The modular fishing rod system according to claim 1, wherein the first collar first fitting is threaded and mateable with threads on the fastener assembly fitting.

11. The modular fishing rod system according to claim 1, wherein the rod collar assembly outer surface is fixable to the inner surface of the upper end of the rod sleeve assembly tube by being adhered to the inner surface of the upper end of the rod sleeve assembly tube.

12. The modular fishing rod system according to claim 1, wherein the first collar first fitting is connectable to the fastener assembly fitting through a quick connect fitting.

13. The modular fishing rod system according to claim 1, wherein the fastener assembly includes a storage capsule having an interior compartment.

14. The modular fishing rod system according to claim 1, wherein the rod collar assembly includes indexing features that position the rod blank in a spine up or spine down position.

15. The modular fishing rod system according to claim 1, wherein the first collar is connected to the lower end of the rod sleeve assembly tube by a pin that is inserted both substantially perpendicular to an axial direction of the rod sleeve assembly tube and through both the rod sleeve assembly tube and the first collar.

16. The modular fishing rod system according to claim 1, wherein the handle collar assembly has a second collar connected to the upper end of the handle assembly tube.

17. The modular fishing rod system according to claim 1, wherein the first collar first fitting is connectable to the fastener assembly fitting via a twist lock mechanism.

18. The modular fishing rod system according to claim 17, wherein the twist lock mechanism includes a spring that cooperates with bearings to hold a nipple of the first collar first fitting when the rod sleeve assembly tube is inserted and removably fixed to the handle assembly.

19. The modular fishing rod system according to claim 1, wherein the handle assembly further includes an upper grip and a lower grip, with the reel seat being located therebetween.

* * * * *